UNITED STATES PATENT OFFICE.

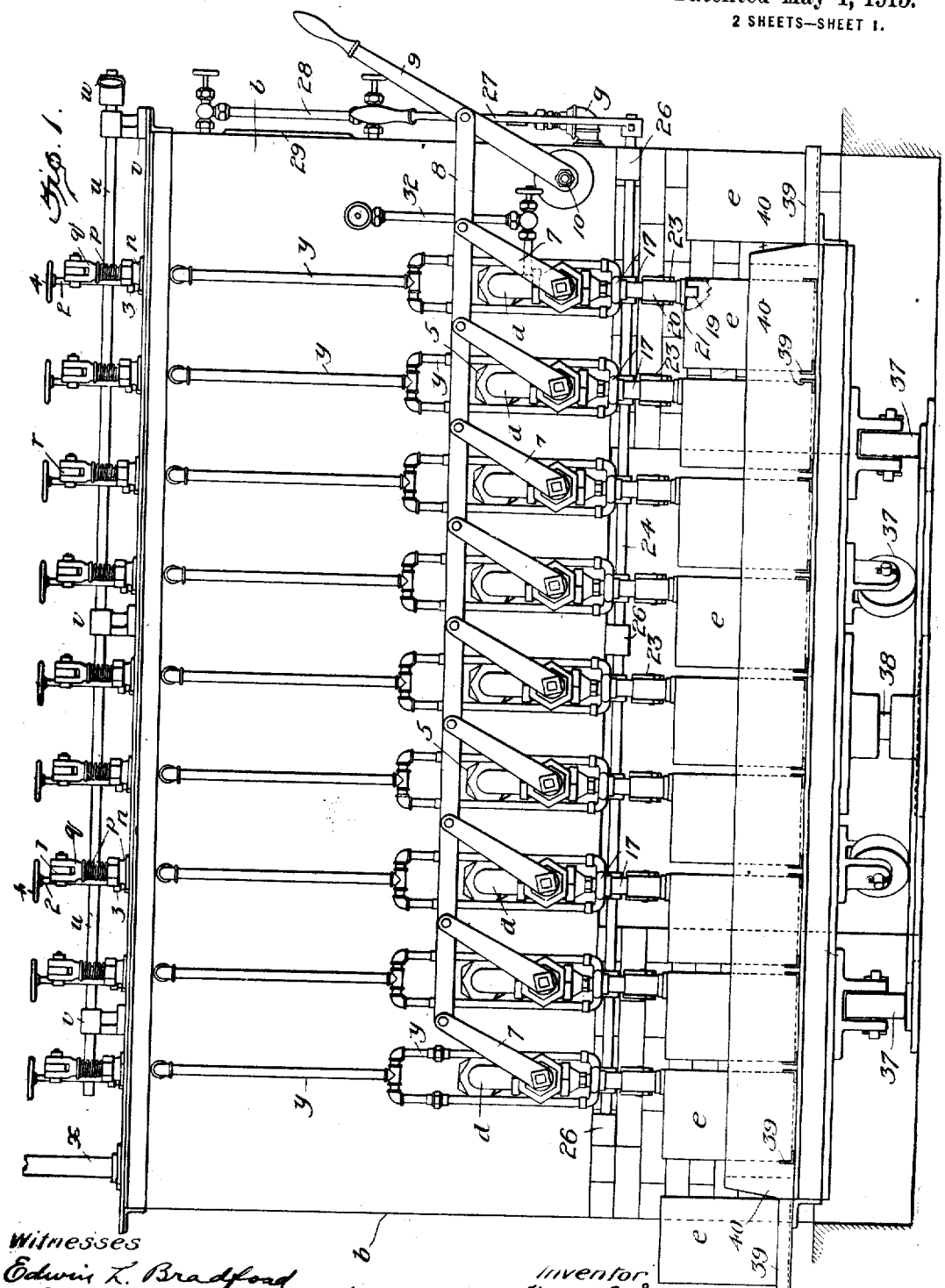

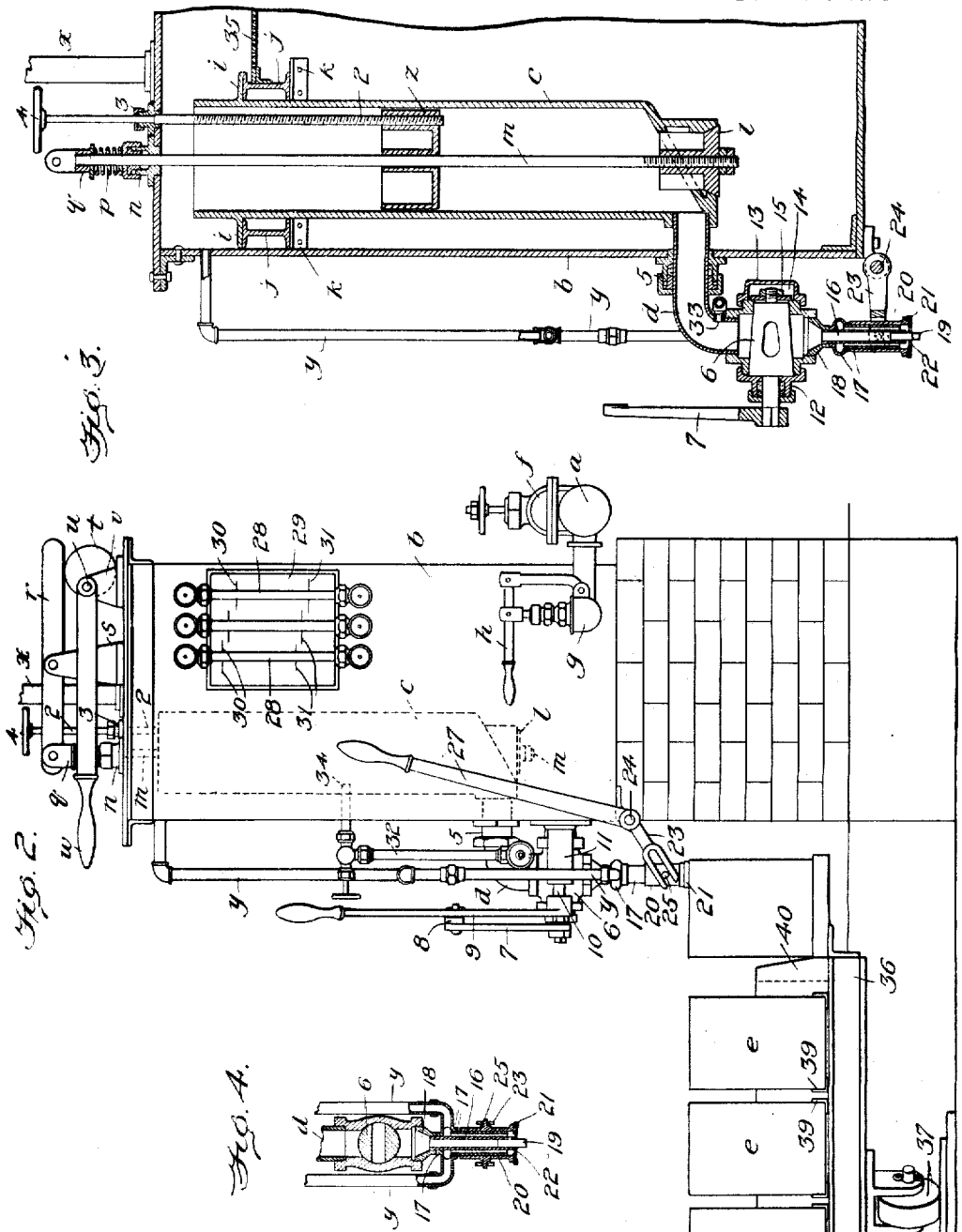

HENRY C. SMART, OF NEW YORK, N. Y., ASSIGNOR TO STANDARD OIL COMPANY OF NEW YORK, OF NEW YORK, N. Y., A CORPORATION OF NEW YORK.

CAN-FILLING MACHINE.

1,138,511.      Specification of Letters Patent.      Patented May 4, 1915.

Application filed July 27, 1912. Serial No. 711,909.

*To all whom it may concern:*

Be it known that I, HENRY C. SMART, a citizen of the United States, residing at New York city, borough of Brooklyn, and county of Kings, in the State of New York, have invented certain new and useful Improvements in Can-Filling Machines, of which the following is a specification.

The invention relates more particularly to machines for contemporaneously filling a number of cans with gasolene in measured quantities; but means within the invention can be used for filling cans with other liquids, as well as with gasolene, and for filling other receiving vessels, as well as cans, with any desired liquid; and each of the improvements composing the invention is intended to be secured for all the uses to which it can be applied, with or without modification.

For filling a number of receiving vessels with measured quantities of liquid, machines have heretofore been devised which include a group of measuring vessels provided with valved inlet passages and valved outlet passages, together with means for operating the inlet valves in unison and means for operating the outlet valves in unison; supports being also provided for holding the receiving vessels in position to have the contents of said measuring vessels simultaneously delivered thereto. In what is considered the best and most complete form of the present invention, the improvements composing the latter are grafted on or employed in connection with a machine of this general description; but some of the improvements admit of a wider application; and modifications, additions and subtractions can be made indefinitely so long as the substance of any one or more of the hereinafter written claims is taken.

In the accompanying drawings: Figure 1 is a front elevation (partly broken away) of a can filling machine in accordance with the invention; Fig. 2 is an end elevation of the same; Fig. 3 is a partial view in vertical section in a plane parallel to that of Fig. 2; and Fig. 4 is a detail view in vertical section in a plane parallel to that of Fig. 1.

The pipe $a$ supplies the gasolene or other liquid to the chamber $b$; which in turn supplies liquid to a group of measuring vessels $c$, each with an outlet passage $d$ for delivering liquid into the corresponding can $e$. The pipe $a$ is provided with a valve $f$ to be closed when the machine is not in use and to be opened to allow the liquid to flow when it is in use and capable of adjustment to regulate the rate of flow through said pipe $a$. At $g$ is a valve for letting in and shutting off the supply of liquid to the chamber $b$ each time the latter is to receive a supply of liquid. In order that the valve may be quickly operated by the attendant, it is provided with a lever handle $h$.

The inlet passages, which connect the measuring vessels $c$ with the supply chamber, consist as shown merely of ports closed by valves $l$ and open into the measuring vessels at the lower parts of the latter. The termination of said inlet passages in the actual bottoms of the vessels is considered the best disposition and is primarily, although not exclusively, intended by the recital that the inlet passages open into the measuring vessels at the lower parts of the latter. Said inlet passages might each of them terminate within such recital at any place below the top of the main measuring portion of the vessel; and any such termination would have a certain advantage over inlet passages opening into the tops of the main measuring portions of the measuring vessels of a can filling machine.

When the valves $l$ are open the inlet passages are interconnected outside of said valves, namely, as shown through the supply chamber $b$, in such manner that the liquid will stand above said valves at the same level in all the vessels $c$. An indicator for exhibiting such common level could be applied to the supply chamber or to any of the measuring vessels. Gage glasses $28$ are shown applied to the chamber $b$ and will be hereinafter again referred to.

The supply chamber $b$ is shown in the form of a tank or large chamber; and the measuring vessels $c$ are located as shown within said tank. The vessels $c$ are shown as provided with supporting ears $i$ (Fig. 3); which rest on I beams $j$ upheld at the ends by brackets $k$ on the end walls of the tank $b$.

The valves $l$ are connected with means for simultaneously opening and closing them. As shown, the stem $m$ of each valve passes through a stuffing box $n$ on top of the tank and is drawn upward against its seat by a spring $p$, between the cover of the stuffing box and the fitting $q$; which is fast on the valve stem. The levers $r$, fulcrumed each of them in a bracket $s$, act at their front ends on the valve stems through the fittings $q$ and at their rear ends bear upon the eccentrics $t$ fast on the rock shaft $u$; which is journaled in brackets $v$ and extends lengthwise of the tank $b$ and is turned by the handle arm $w$. When the arm $w$ is drawn down, the eccentrics $t$ raise the rear ends of levers $r$ and depress the valves $l$ to open them. When the arm $w$ is raised the springs $p$ lift the valves $l$ into contact with their respective seats.

The vessels $c$ open at the top into the tank $b$; which is closed on top except for the vent pipe $x$, leading to any desired point. There is thus no chance for vapors of gasolene or other volatile liquid to escape into the atmosphere of the room in which the can filling apparatus is located. The open tops of the vessels $c$ allow the air to escape into the tank when said vessels are receiving liquid and to flow back into said vessels when they deliver liquid into their respective cans.

It is intended to have the measuring vessels all of the same capacity; but the desired uniformity is not easy, if possible, to secure without adjusting devices. Each measuring vessel $c$ is shown, therefore, as provided with an adjustable device $z$, herein termed a liquid displacer, which is designed to occupy a portion of the space below the liquid level in said measuring vessel when the latter has received its charge. It would best fill the interior of the vessel approximately; so that the addition of a comparatively small quantity of liquid to the contents of a measuring vessel, or its subtraction therefrom, results in a comparatively large change in the liquid level therein when said level is intermediate the top and bottom of said displacer. The adjusting means shown include a screw threaded rod 2 engaging a threaded opening in the displacer through a stuffing box 3 on top of tank $b$. At 4 is a hand wheel for operating the rod 2.

Each spout $d$ passes through a stuffing box 5 in the front wall of tank $b$ and is provided with a valve 6 operated by a lever arm 7 to open and close the same. These lever arms are moved simultaneously through the connecting rod 8; which is jointed to the operating lever 9 turning (as shown) on a pin 10 that is fast in a socket 11 on the tank $b$. To prevent escape of gasolene at the valve, the valve stem passes through a stuffing box 12 and a screw cap 13 covers the small end of the valve. The plate 14 bears upon the casing of the valve and the valve is drawn tight by the nut 15; which engages a threaded projection on the small end of said valve.

Below each spout valve is a nozzle 16 and an air duct 17, the former fast in the fitting 18 (which is supported by the valve casing) and the latter fast on the nozzle 16. The nozzle is provided with an adjustable extension 19; which moves in and out at the lower end of said nozzle; and the air duct is provided with an adjustable extension 20, which moves up and down at the lower end of the air duct and is provided at its own lower end with a packing ring 21. The two extensions are connected with each other by spider arms 22 and are moved by a forked lever arm 23 of rock shaft 24 engaging pins 25 on the extension 20.

Each air duct 17 communicates through a pipe $y$ (herein above mentioned) with the air space of the tank $b$. Each pipe $y$ is branched around its spout $d$. The shaft 24 is journaled in brackets 26 and is moved by the lever arm 27.

To allow the introduction of the cans $e$ below the spouts $d$, the extensions 19 and 20 of the liquid nozzles and the air ducts are raised through the lever arm 27 and rock shaft 24. When the cans are in place, the extensions are lowered so as to insert the nozzle extension 19 into the hole in the top of the can and to bring the packing 21 of the air duct extension 20 into contact with the can top.

The tank $b$ is filled with the gasolene or other liquid to a predetermined level by opening the valve $g$. When the liquid reaches said level, the valve $g$ is closed. To facilitate this filling of tank $b$ one or more gage glasses 28 are provided so that the liquid level can be seen in said glasses; and said gage glasses are best arranged opposite a mirror 29; which is provided with one or more graduations 30 for each gage glass. As shown, there are three gage glasses and three lines 30, one for each glass. These lines indicate the respective levels to which the tank is filled with liquid for three different measurements. When the tank $b$ has been filled to one of these levels and the valve $g$ has been closed, all the valves $l$ are simultaneously opened by the attendant by drawing down the lever arm $w$. The liquid then enters the measuring vessel $c$ through the inlet passages at their lower parts until the liquid level is the same inside of said measuring vessels $c$ as in the tank $b$. A predetermined quantity of liquid will then have entered each measuring vessel; which quantity will be the same for each vessel; because any inequalities in the interiors of the vessels will have been corrected by the adjustments of the displacers $z$. The filling of the measuring vessels to the level of the liquid in tank $b$ will be shown by the cessation of movement in the gage glasses 28; or it may be shown by reference to graduated lines 31 on the mirror 29.

After filling the measuring vessels c, the valves l are all of them closed; and the valves 6 are all of them opened so that the liquid can run out into the cans e. The air from the cans e passes through the pipes y into the tank b; so that it does not interfere with the inflow of liquid and does not carry vapors into the room in which the filling apparatus may be placed. By letting liquid into the tank b while the measuring vessels c are discharging and by filling the measuring vessels c from the tank b after closure of the valve g in supply pipe a, no air need enter or leave the tank b; and the latter might consequently be wholly closed against egress or ingress of air if the air from pipes y were otherwise carried off. The gage glass 32 communicates at 33 with the interior of one of the spouts 5 and at 34 with one of the measuring vessels c, and serves to indicate to the attendant when the measuring vessels c, are empty. When this occurs, he closes all the valves 6, lifts the extensions 19 and 20 of the liquid nozzles and the air ducts and effects the removal of the filled cans and the replacement of them with cans e to be filled.

Simultaneously with the opening of valves 6 the attendant should open the valve g so as to fill the tank b while the measuring vessels c are emptying. To avoid waits, the tank b should be filled at least as soon as the measuring vessels c are empty; so that as soon as the attendant has closed the emptying valves 6 he may open the filling valves l. A perforated plate 35 may be placed in the tank b a short distance below the liquid level when the tank has been filled in order to check the swashing or surging of liquid in the tank b while filling and thus to bring it more quickly to a quiet state. Other arrangements for preventing or avoiding swashing or surging either in filling the tank or at other times can be used.

To facilitate the introduction and removal of the cans e a turntable 36 is shown; but any known or suitable means for supporting a number of separate receiving vessels can be employed. The turntable 36 as shown is mounted on rollers 37; which travel on a circular track about a central pivot 38. The table is square in plan; and at each edge there are places between the angular supports 39 for the cans e. The cans e can be inserted in these places until they come into contact with the back piece 40.

While filling a row of cans, another row of empty cans can be placed on the turntable. When the filled cans are turned out from under the spouts d, the same quarter turn of the turntable will bring empty cans under the spouts.

While the operation of the machine as described has been to supply to tank b all the liquid which is to be measured by the vessels c before opening the inlet valves l, it is also possible to supply all or any desired part of said liquid to tank b while the valves l are open. For example, if the liquid in tank b should be standing at one of the lines 31 and the vessels c should have been just emptied through valves 6 (valve g being closed), the valves 6 might be closed and the valves l and g then be opened together and left open until the liquid level in tank b (which would naturally fall temporarily as the liquid entered the vessels c until it attained the same level in them as in tank b) should again reach that one of the lines 31 which should correspond with the quantity to be measured by each of the vessels c. Thereupon the valves g and l could be closed and the valves 6 be opened. This latter mode of working would be slower and less accurate than that previously described; but it might be advantageous should it be desired to fill the vessels c to a higher level than would otherwise be possible (say, to the level of one of the lines 30) in order to measure very large quantities of liquid.

In either way of working, the lower down on the measuring vessels the inlet passages are placed, the quicker will the vessels c fill up to the level of the liquid in tank b; because the longer will be the unbalanced column tending to force the liquid into said vessels c when the inlet valves l are opened.

As shown, the measuring vessels c are wholly above the bottom of tank b; and such construction is primarily, but not exclusively, intended by the recital that said measuring vessels have their main measuring portions above said tank bottom. Even if the main measuring portions of vessels c were not wholly above the tank bottom, there would be an unbalanced column in the tank tending to force the liquid into said vessels c when the valves l are opened until the liquid level is the same inside and outside of said vessels c.

I claim as my invention or discovery:

1. A machine for filling a number of receiving vessels simultaneously with measured quantities of liquid, comprising a supply chamber, a number of measuring vessels which have their measuring portions within said supply chamber and are provided with stationary inlet passages opening from the lower part of said chamber into the lower parts of said measuring vessels and also with stationary outlet passages extending from said measuring vessels through a wall of said supply chamber, two distinct sets of valves for controlling said inlet and said outlet passages respectively, the inlet valves being located within and the delivery valves outside of said supply chamber, and means for moving the valves of each set in unison, operating means for the inlet valves extending through a wall of said supply chamber for operation outside the same, and the outlet passages between said outside delivery valves and the measuring vessels being in free communication with the latter so that portions of the measured charges are contained in said passages, substantially as described.

2. A machine for filling a number of receiving vessels simultaneously with measured quantities of liquid, comprising a supply chamber, a number of upright measuring vessels which have their measuring portions within said supply chamber and are provided with stationary inlet passages opening through the bottoms of said measuring vessels from said supply chamber and also with valved outlet passages extending horizontally from said measuring vessels through a vertical wall of said supply chamber, valves in the form of horizontally disposed disks which are movable up and down for controlling said inlet passages, and means which include vertical stems attached directly to said disks and extending upwardly therefrom for operating said inlet valves in unison, substantially as described.

3. A machine for filling a number of receiving vessels simultaneously with measured quantities of liquid, comprising a supply chamber, a number of measuring vessels which have their measuring portions within said chamber and are provided with stationary inlet passages opening from said chamber into the lower parts of said measuring vessels and which are also provided with stationary outlet passages extending from said measuring vessels through a wall of said chamber for delivering the charges to said receiving vessels, vertically movable valves which control said inlet passages and which have longitudinally movable stems connected directly with said valves and extending upward through the tops of said measuring vessels and said chamber, and delivery valves which are located outside of said chamber in said stationary outlet passages, substantially as described.

4. A machine for filling a number of receiving vessels simultaneously with measured quantities of liquid, comprising a supply chamber, a number of measuring vessels which have their measuring portions within said chamber and are provided with stationary inlet passages opening from said chamber into the lower parts of said measuring vessels and which are also provided with stationary outlet passages extending from said measuring vessels through a wall of said chamber for delivering the charges to said receiving vessels, vertically movable valves which control said inlet passages and which have longitudinally movable stems connected directly with said valves and extending upward through the tops of said measuring vessels and said chamber, vertically adjustable displacers which are located in said measuring vessels above said inlet valves and approximately fill the horizontal areas of said measuring vessels and which are provided with openings through which said valve stems pass, rods connected with said displacers and extending upward through the tops of said measuring vessels and said chamber, means for adjusting said rods individually so as to shift the displacers individually in a longitudinal direction, and delivery valves which are located outside of said chamber in said stationary outlet passages, substantially as described.

5. A machine for filling a number of receiving vessels simultaneously with measured quantities of liquid, comprising a supply chamber closed on top in order to exclude the aeriform contents of said chamber from the atmosphere of the room in which it is placed, a number of measuring vessels which have their measuring portions within said chamber and are provided with stationary inlet passages opening from said chamber into the lower parts of said measuring vessels and which are also provided with stationary outlet passages extending from said measuring vessels through a wall of said chamber for delivering the charges to said receiving vessels, vertically movable valves which control said inlet passages and which have longitudinally movable stems connected directly with said valves and extending upward through the tops of said measuring vessels and said chamber, vertically adjustable displacers which are located in said measuring vessels above said inlet valves and approximately fill the horizontal areas of said measuring vessels and which are provided with openings through which said valve stems pass, rods connected with said displacers and extending upward through the tops of said measuring vessels and said chamber, means for adjusting said rods individually so as to shift the displacers individually in a longitudinal direction, stuffing-boxes on the cover of said chamber around said valve stems and said displacer adjusting rods, and delivery valves which are located outside of said chamber in said stationary outlet passages, substantially as described.

6. A measuring vessel provided with a valved inlet passage opening into the lower part of said vessel and also with a valved outlet passages for delivering the measured charge, in combination with an adjustable displacer which approximately fills the horizontal area of said vessel and is suitably guided in its movements of adjustment and which is provided with a screw-threaded opening therein, and a screw-threaded adjusting rod which engages in said opening and is mounted to turn and at the same time to be held from movement longitudinally, so that the vertical space necessary to accommodate said measuring vessel and accessories is not dependent on the adjustment of the displacer, substantially as described.

7. The combination with means for supporting a number of separate receiving vessels, of a number of stationary outlets provided with valves and terminating in extensible nozzles which are distinct from said valves and are telescopically connected with said stationary outlets, means for moving said valves in unison, and means for moving said nozzles in unison independently of said valves, substantially as described.

8. The combination with means for supporting a number of separate receiving vessels, of a number of stationary outlets provided with valves and terminating in extensible nozzles which are distinct from said valves and are telescopically connected with said stationary outlets, a number of stationary air ducts provided with adjustable extensions which are telescopically connected therewith and are adapted to be put into communication with the interiors of said receiving vessels, means for moving said valves in unison, and means for moving said nozzles and said air duct extensions in unison together independently of said valves, substantially as described.

9. The combination with a measuring vessel provided with a stationary valved outlet passage and an adjustable extension therefor telescopically connected with said outlet passage beyond the valve, of a stationary air duct secured to said outlet passage, an adjustable extension for said duct telescopically connected therewith and inclosing the adjustable extension of said outlet passage, and arms connecting an adjustable extension of each kind with one of the other kind for operating them together, substantially as described.

10. A machine for filling a number of receiving vessels simultaneously with measured quantities of liquid, comprising a supply chamber closed on top in order to exclude the aeriform contents of said chamber from the atmosphere of the room in which it is placed, a vent pipe connected with the interior of said chamber for conveying away its surplus aeriform contents, a number of measuring vessels which are vented into said chamber and communicate therewith through stationary valved passages for letting liquid into said vessels and which are also provided with stationary valved outlet passages but are otherwise closed, stationary air ducts opening each of them at one end into the upper part of said chamber and at the other end terminating in proximity to the termination of one of said outlet passages, adjustable extensions telescopically connected with said outlet passages beyond the valves, adjustable extensions telescopically connected with said air ducts, and arms connecting an adjustable extension of each kind with one of the other kind for operating them together, substantially as described.

11. The combination with a number of measuring vessels arranged with their axes in the same vertical plane, of stationary outlet pipes leading from said vessels and having vertical portions, plug valves turning in casings included in vertical portions of said in the same vertical plane, of stationary outlet pipes leading from said vessels and having vertical portions, plug valves turning in and a connecting rod jointed to said operating arms for turning said plug valves in unison by movements in a plane parallel with that in which the axes of said measuring vessels are located, substantially as described.

12. The combination with a number of measuring vessels, of stationary outlet pipes leading from said vessels and having vertical portions, adjustable extensions telescopically connected with vertical portions of said outlet pipes, a rock shaft, and arms which are fixed on said rock shaft and are jointed to said adjustable extensions for moving the same in unison, substantially as described.

13. The combination with a number of measuring vessels, of outlet pipes leading from said vessels and having vertical portions, stationary air ducts, adjustable extensions telescopically connected with said air ducts and inclosing each a vertical portion of a corresponding outlet pipe, a rock shaft, and arms which are fixed on said rock shaft and are jointed to said adjustable extensions for moving the same in unison, substantially as described.

14. The combination with a number of measuring vessels, of stationary outlet pipes leading from said vessels and having vertical portions, stationary air ducts attached to said outlet pipes near their outer ends, two sets of adjustable extensions telescopically connected one set with said outlet pipes and the other set with said air ducts, a rock shaft, and arms which are fixed on said rock shaft and are connected with both sets of adjustable extensions for operating the same in unison, substantially as described.

15. A machine for filling a number of receiving vessels simultaneously with measured quantities of liquid, comprising a supply chamber, a number of measuring vessels which are provided with valved inlet passages intermediate the lower parts of said measuring vessels and said chamber and also with valved outlet passages for delivering the charges from said measuring vessels to said receiving vessels, adjustable displacers which are located in said measuring vessels above said inlet passages and which approximately fill the horizontal areas of said vessels, and means for adjusting all of said displacers in order to make changes in the measured charges and also for adjusting them relatively to each other in order to compensate for inequalities and irregularities in the several measuring vessels, substantially as described.

16. A machine for filling a number of receiving vessels simultaneously with measured quantities of liquid, comprising a supply chamber, a number of measuring vessels provided with valved inlet passages opening from said chamber into the lower parts of said measuring vessels and also with valved outlet passages for delivering the measured charges to said receiving vessels, means for supplying liquid to said chamber, and an indicator applied to said chamber and provided with a higher and a lower level indicating mark located both of them above said inlet passages and separated from each other by such an interval that the cubic contents of said chamber between the levels equals the sum of the measured charges in all of said measuring vessels when these are filled to the lower of said levels, substantially as described.

In testimony whereof I affix my signature in presence of two witnesses.

HENRY C. SMART.

Witnesses:
R. E. PATTERSON,
JOHN GRAHAM.

Copies of this patent may be obtained for five cents each, by addressing the "Commissioner of Patents, Washington, D. C."

It is hereby certified that in Letters Patent No. 1,138,511, granted May 4, 1915, upon the application of Henry C. Smart, of New York, N. Y., for an improvement in "Can-Filling Machines," errors appear in the printed specification requiring correction as follows: Page 2, line 115, for the word "yessel" read *vessels;* page 3, line 57, for the word "rod" read *row;* page 4, line 121, claim 6, for the word "passages" read *passage;* page 5, claim 11, strike out lines 76-78 and insert the words and commas *outlet pipes on horizontal axes which are perpendicular to said plane, upright operating arms attached to said plug valves;* and that the said Letters Patent should be read with these corrections therein that the same may conform to the record of the case in the Patent Office Signed and sealed this 16th day of May, A. D., 1916.

[SEAL.]

J. T. NEWTON,

*Acting Commissioner of Patents.*

Cl. 226—18